March 19, 1968 D. SCARAMUCCI 3,373,968
BETWEEN-FLANGE BALL VALVE WITH SLIDABLE SEATS
Filed April 12, 1965 3 Sheets-Sheet 2
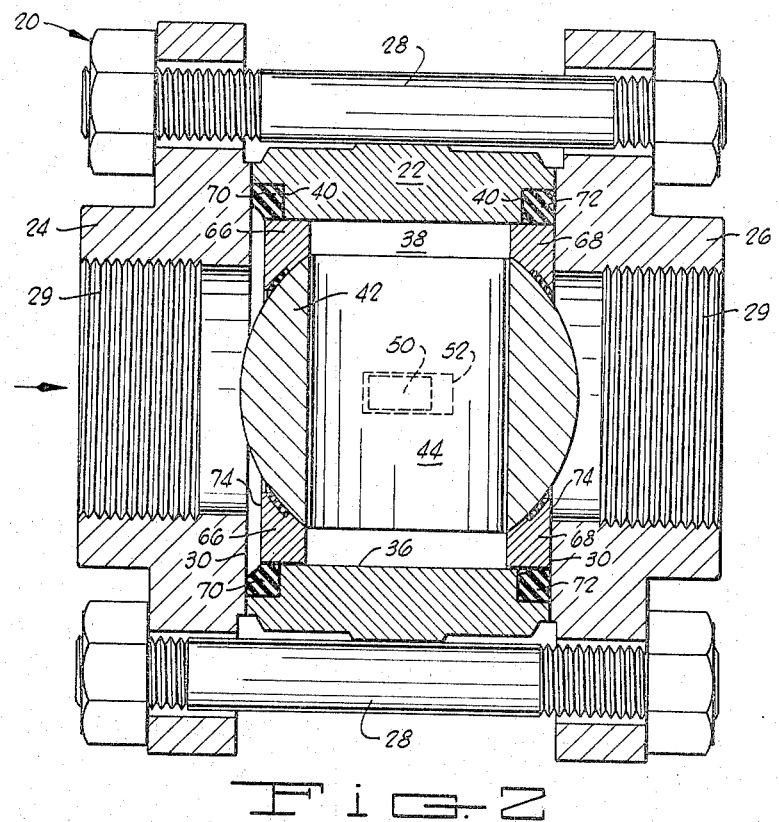
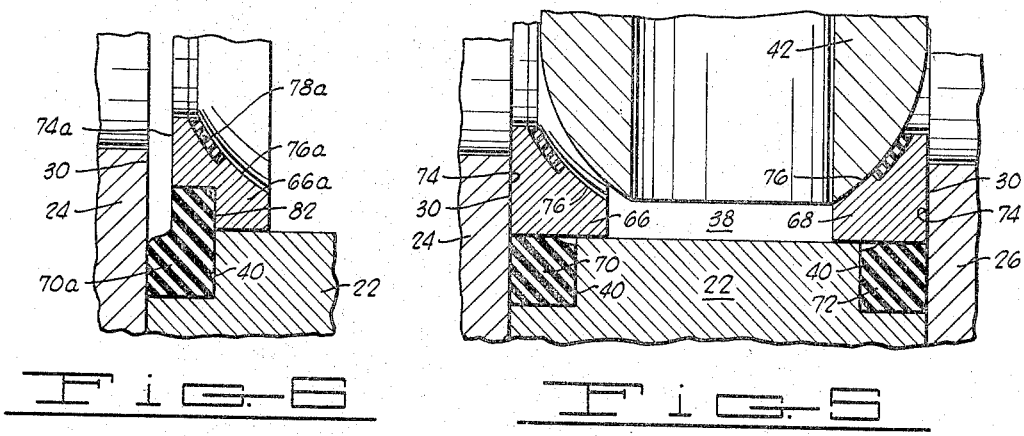
INVENTOR.
DOMER SCARAMUCCI
BY
Dunlap & Laney
ATTORNEYS

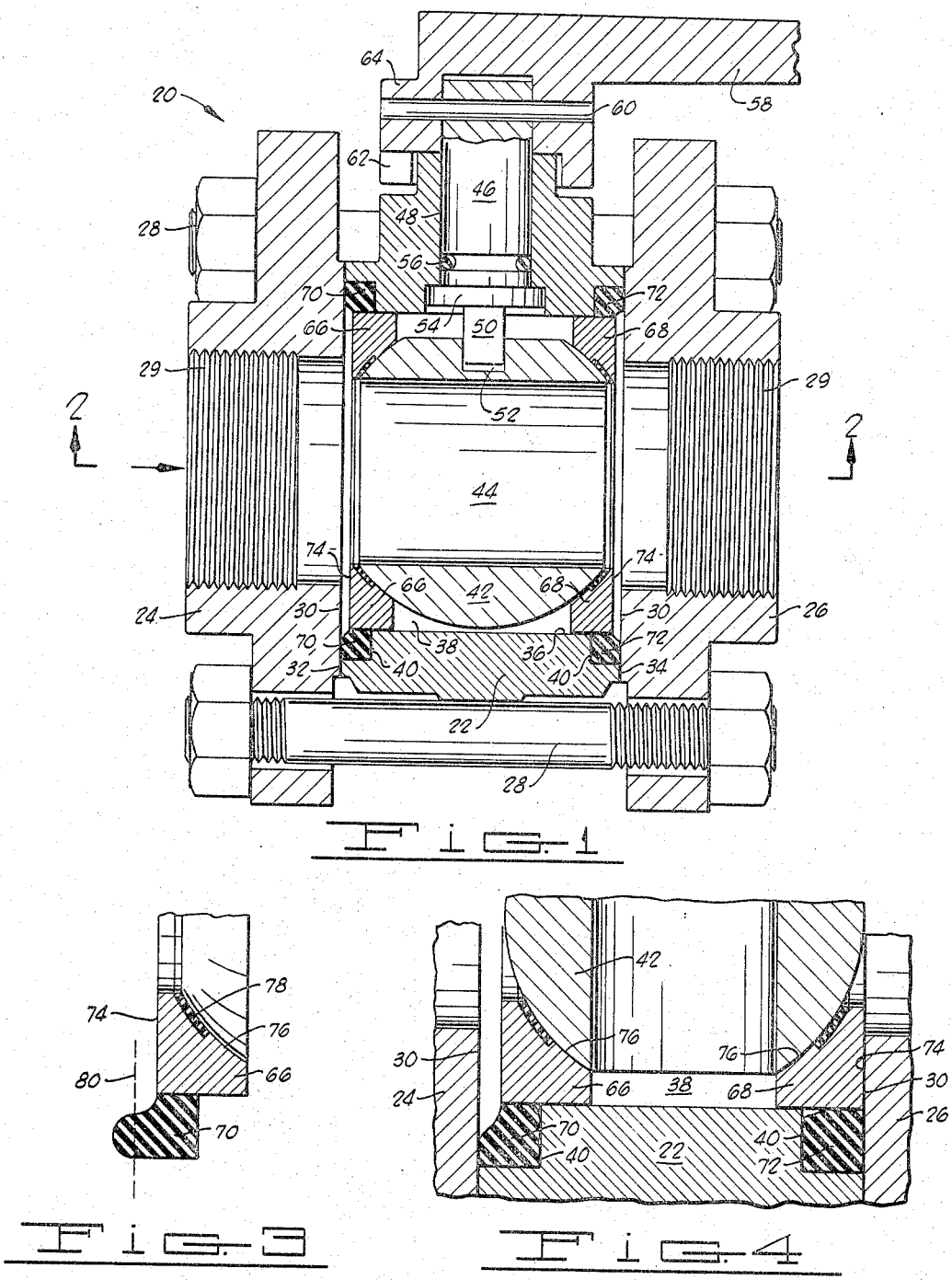

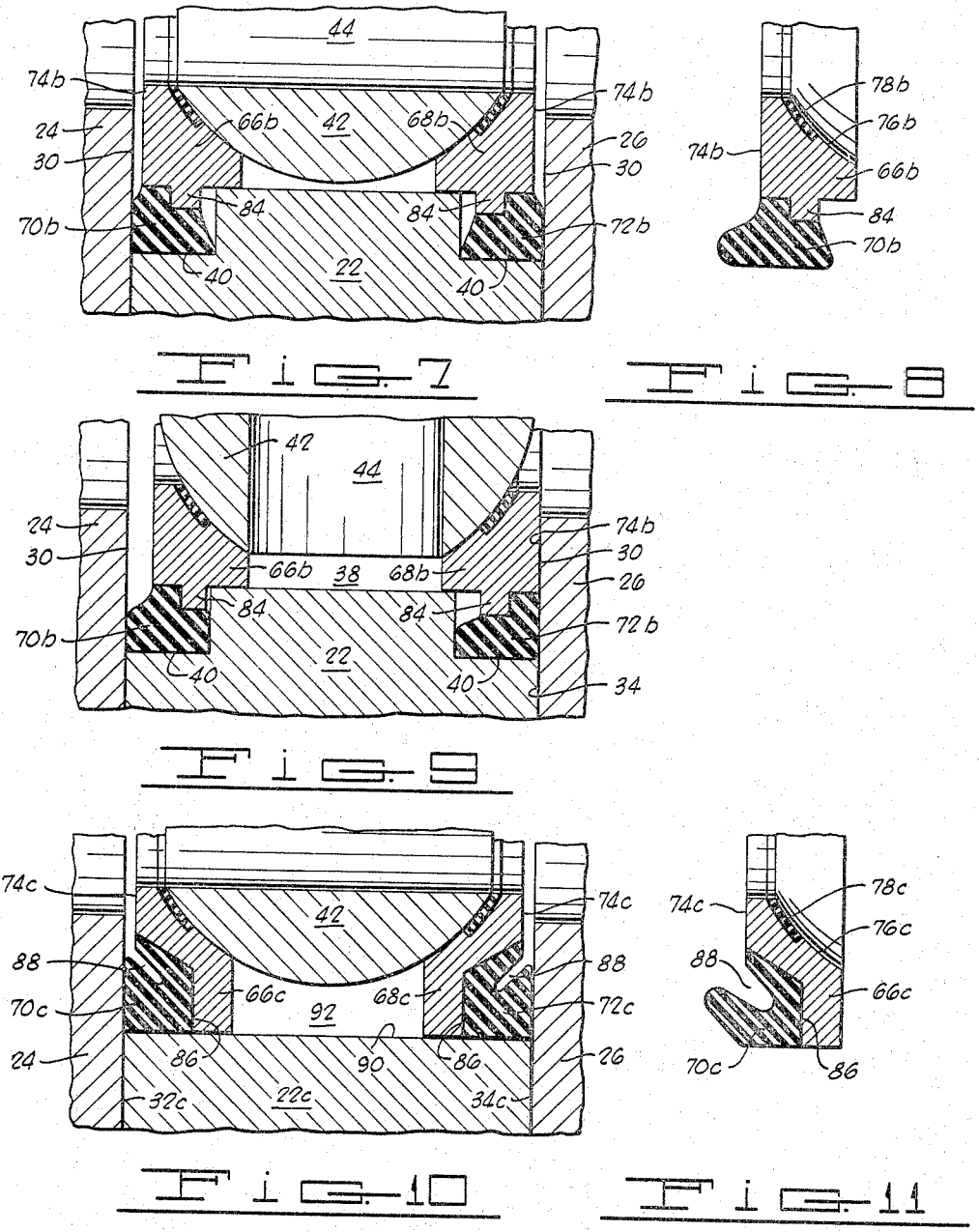

United States Patent Office 3,373,968
Patented Mar. 19, 1968

3,373,968
BETWEEN-FLANGE BALL VALVE WITH
SLIDABLE SEATS
Domer Scaramucci, 3245 S. Hattie,
Oklahoma City, Okla. 73129
Filed Apr. 12, 1965, Ser. No. 447,448
16 Claims. (Cl. 251—148)

ABSTRACT OF THE DISCLOSURE

A floating ball-type valve wherein the seating rings are slidable in the valve chamber with upstream and downstream movement of the ball. Each seating ring has an elastic material seal ring bonded around the outer periphery thereof positioned to form a seal between the seating ring and the body and between the body and a pipe flange secured to the respective end of the body. Each seal ring also functions to urge the respective seating ring against the ball, whereby the upstream seat provides an upstream seal for the valve when the valve is closed.

This invention relates generally to improvements in ball valves, and more particularly, but not by way of limitation, to a ball valve adapted to be installed between standard pipe flanges.

As it is well known in the art, ball valves have historically been provided with connectors on the opposite ends of the valve body for connecting the opposite ends of the body to adjacent sections of a pipe line or other flow line. Many ball valves in the past have been provided with internally threaded inlets and outlets to be screw connected with joints of pipe. Other types of ball valves in the past have been provided with flanges formed integrally on the opposite ends of the valve body for connection with mating pipe flanges. In either case, the provision of the connectors unduly increases the cost of the ball valve, both from the view point of the extensive machine work required and from the view point of the total cost of materials used in the valve.

The present invention contemplates a novel ball valve constructed wherein the valve body is simply provided with flat end faces and is bolted between a pair of standard pipe flanges to interpose the valve in a pipe line or flow line. The valve chamber for the valve is provided by merely forming a bore through the valve body which may be of uniform diameter between the opposite ends of the valve body, or may be provided with counterbores in the opposite ends thereof, depending upon the type of seal desired to be used between the body and the flanges. High strength material seating rings are inserted in the opposite ends of the bore forming the valve chamber to mate with the adjacent surfaces of the ball positioned in the valve chamber. An elastic material sealing ring is bonded around each of the seating rings and is shaped to prevent the leakage of fluid between the adjacent flange and the adjacent end of the valve body, as well as to prevent the leakage of fluid around the outer periphery of the respective seating ring. In the preferred construction, the seating rings are slidable into the valve chamber an appreciable distance, and the sealing ring on each seating ring projects outwardly beyond the respective end face of the valve body and seating ring, whereby the seating rings are resiliently urged into contact with the opposite sides of the ball and the pipe flanges do not directly contact the seating rings. In this preferred construction, the pipe flanges are bolted tightly against the opposite ends of the valve body and are normally spaced from the seating rings, such that the seating rings will not be distorted by the action of bolting the pipe flanges to the valve body and will not bind the movement of the valve ball.

An object of the invention is to provide a ball valve requiring a minimum of machine work in the manufacture thereof.

Another object of this invention is to provide a ball valve requiring the minimum metal in its construction.

A further object of this invention is to provide a ball valve body which may be simply clamped between a pair of standard pipe flanges to provide a complete valve assembly.

A further object of this invention is to provide a ball valve used between a pair of standard pipe flanges wherein the valve seats will not be distorted by the action of clamping the pipe flanges against the opposite ends of the valve body.

Another object of this invention is to provide a ball valve used between a pair of standard pipe flanges wherein the flanges are sealed to the opposite ends of the valve body by sealing rings carried by the valve seats.

Another object of this invention is to provide a ball valve which may be easily and simply repaired in a minimum of time.

A still further object of this invention is to provide an economically constructed ball valve assembly which will have a long service life and which will require a minimum of maintenance.

Other objects and advantages of the invention will be evident from the following detailed description when read in conjunction with the accompanying drawings which illustrate the invention.

In the drawings:

FIG. 1 is a vertical sectional view through a ball valve assembly constructed in accordance with this invention.

FIG. 2 is a sectional view taken along lines 2—2 of FIG. 1.

FIG. 3 is an enlarged typical cross-sectional view through one of the seating ring assemblies used in the valve of FIGS. 1 and 2 to more clearly illustrate details of construction.

FIG. 4 is an enlarged cross-sectional view through a portion of the valve shown in FIGS. 1 and 2 illustrating the action of the valve when the valve is closed.

FIG. 5 is a view similar to FIG. 4 showing the action of the upstream valve seat when the pressure in the valve chamber exceeds the upstream pressure.

FIG. 6 is an enlarged typical cross-sectional view through an alternate seating ring assembly construction which may be used in the valve of FIGS. 1 and 2.

FIG. 7 is another partial cross-sectional view through a valve, similar to FIG. 4, showing another form of valve seat assembly which may be used in the valve of FIGS. 1 and 2.

FIG. 8 is an enlarged typical cross-sectional view of one of the valve seat assemblies illustrated in FIG. 7 showing the relaxed configuration of the sealing ring.

FIG. 9 is a view similar to FIG. 7 illustrating the action of the valve when the valve is closed.

FIG. 10 is another view similar to FIG. 4, but of an alternate valve construction.

FIG. 11 is an enlarged typical cross-sectional view through one of the valve seat assemblies shown in the valve of FIG. 10, illustrating the relaxed shape of the sealing ring.

Referring to the drawings in detail, and particularly FIG. 1, reference character 20 generally designates a ball valve assembly basically comprising a tubular valve body 22 secured between a pair of standard pipe flanges 24 and 26 by means of a plurality of bolts 28. The outer periphery of the valve body 22 may be provided with circumferentially spaced grooves (not shown) to receive the bolts 28 and facilitate the concentric clamping of the volve body 22 between the flanges 24 and 26, if desired. Each of the flanges 24 and 26 has a threaded bore 29 therethrough for connection with the end of a pipe (not shown). As it is well known, the inner end face 30 of each of the standard pipe flanges 24 and 26 is normally machined flat before such flanges are sold to consumers for use in making various types of pipe connections. In producing the present valve, both the upstream end face 32 and the downstream end face 34 of the valve body 22 are also machined flat to mate with the inner faces 30 of the respective pipe flanges 24 and 26 and provided a rigid valve assembly when the bolts 28 are tightened.

The valve body 22 is provided with a bore 36 extending therethrough between the end faces 32 and 34 larger in diameter than the bores 29 of the pipe flanges 24 and 26 to form a valve chamber 38. Also, in this embodiment, a counterbore 40 is provided in each end of the body 22 concentrically around the bore 36 for purposes to be described. A valve ball 42 is positioned in the valve chamber 38 and has the usual port 44 therethrough to control the flow of fluid through the valve. At this point it should also be noted that the horizontal diameter of the ball 42 is less than the length of the valve body 22.

A valve stem 46 extends through an aperture 48 in the top of the valve body 22 to control the turning movement of the ball 42. The inner end 50 of the valve stem 46 is preferably rectangular in cross-section, as is most clearly shown in FIG. 2, and mates in a slot 52 in the top of the ball 42. Thus, when the stem 46 is turned, the ball 42 will be turned, and when the ball 42 is turned to a closed position as shown in FIG. 2, the ball is free to move axially along the valve chamber bore 36 a limited distance, for purposes to be described. The valve stem 46 is provided with a flange 54 within the valve body 22 to engage the valve body and prevent outward movement of the stem. Also, a suitable sealing ring 56, such as an O-ring, is provided in a mating groove around the valve stem 46 to prevent the leakage of fluid from the valve chamber 38 through the aperture 48. The valve stem 46 is turned by use of a suitable handle 58 connected to the valve stem by a pin 60. A lug 62 is formed on the lower end of the handle hub 64 to mate with a co-operating lug (not shown) on the valve body 22 and limit the turning movement of the ball 42 to a 90° arc for indexing the opening and closing movements of the valve.

Valve seating rings 66 and 68 are slidably positioned in the opposite ends of the valve chamber 38 to mate with the opposite sides of the ball 42. The upstream seating ring 66 is provided with an elastic material sealing ring 70 bonded around the outer periphery thereof and positioned in the counterbore 40 at the upstream end 32 of the valve body. The downstream seating ring 68 is provided with a similarly constructed elastic material sealing ring 72 bonded around the outer periphery thereof and positioned in the counterbore 40 at the downstream end 32 of the valve body. It will be understood that the seating rings 66 and 68 are formed of a high strength material, such as metal, as contrasted with the elastic material sealing rings 70 and 72. It should also be noted in FIG. 1 that the distance between the outer end faces 74 of the seating rings 66 and 68, when the seating rings are engaged with the ball 42, is less than the length of the valve body 22 between the upstream and downstream end faces 32 and 34. Therefore, when the flanges 24 and 26 are bolted against the opposite ends of the valve body, the flanges will not apply force to the seating rings 66 and 68 which would tend to distort the seating rings and bind the seating rings against the ball 42.

As most clearly shown in FIG. 3, the front face 76 of the upstream seating ring 66 is curved to mate with the outer surface of the ball 42 and is provided with an inner seal ring 78 bonded in a mating groove in the front face 76 to provide an effective seal of the seating ring to the ball 42. The seal 78 is formed of a relatively soft elastic material to provide the most efficient seal with the outer surface of the ball 42. The sealing ring 70 of the upstream seating ring 66 is shown in its relaxed form in FIG. 3.

It is there shown that the sealing ring 70 projects outwardly an appreciable distance beyond the outer face 74 of the seating ring 66 to be engaged by the respective flange 24 when the valve is assembled. The vertical dashed line 80 in FIG. 3 indicates the position of the inner face 30 of the flange 24 when the valve is assembled to illustrate that the respective sealing ring 70 is appreciably distorted by the flange 24. In this connection it should also be noted that the axial thickness of the sealing ring 70 is greater than the depth of the respective body counterbore 40 which results in the sealing ring 70 being appreciably distorted and placed under compression against the walls of the respective counterbore 40 when the valve is assembled. It will be understood that the downstream seating ring 68 and sealing ring 72 are constructed in the same manner as the upstream seating ring 66 and upstream sealing ring 70 shown in FIG. 3, so further detailed description of the downstream seating ring 68 is not required.

FIG. 1 shows the valve 20 in an open position, and thus the ball 42 is centered in the valve chamber 38. In this condition of the valve, both of the seating rings 66 and 68 will be spaced inwardly from the respective flanges 24 and 26. Fluid in the upstream end of the valve chamber 38 will tend to flow radially outward between the outer end face 74 of the seating ring 66 and the adjacent face 30 of the flange 24. This fluid will react against the sealing ring 70 to further press the sealing ring 70 against the flange face 30 and the walls of the counterbore 40 to actually enhance the seal provided between the flange 24 and the valve body 22, such that no fluid will leak between these parts. The same condition applies with respect to the downstream sealing ring 72 to prevent any leakage of fluid between the valve body 22 and the flange 26.

When the ball 42 is turned to a closed position as shown in FIG. 2, the upstream pressure will react against the ball and move the ball toward the downstream end 34 of the valve body, as indicated by the relative positions of the inner end 50 of the valve stem 46 and ball slot 52 in FIG. 2. As also shown in FIG. 4, the downstream movement of the ball 42 is stopped when the outer end face 74 of the downstream seating ring 68 contacts the inner face 30 of the flange 26. In this position of the downstream seat 68, the respective sealing ring 72 will be wholly confined in the respective counterbore 40, and the front face 76 of the seating ring 68 will remain in sealing engagement with the ball 42. Thus, the seating ring 68 still functions as a downstream seal for the ball 42, and the sealing ring 72 prevents the leakage of fluid between the body 22 and the flange 26.

As the ball 42 moves downstream as shown in FIGS. 2 and 4, the upstream valve seat 66 follows the movement of the valve ball, since the only restraint to the movement of the seating ring 66 is by virtue of the sealing ring 70 being trapped in the respective counterbore 40. Thus, the front face 76 of the seating ring 66 remains in sealing engagement with the ball 42 to form an upstream seal when the valve is closed. It should also be noted in FIG. 4 that the upstream fluid tending to flow outwardly between the flange 24 and the seating ring 66 will be trapped by the upstream sealing ring 70 and prevented from leaking between the flanges 24 and the body 22. In the position of the seating ring 66 shown in FIG. 4, the sealing ring 70 remains compressed by the flange 24 to assure that the sealing ring makes contact with the flange 24.

In the event the pressure in the valve chamber 38 should build up to a pressure greater than the upstream pressure when the valve 20 is closed, this pressure in the valve chamber reacts across the upstream seating ring 66 and moves the upstream seating ring toward the flange 24 as shown in FIG. 5. The seating ring 66 will be stopped in its upstream movement by contacting the inner face 30 of the flange 24. Thus, the front face 76 of the seating ring 66 will be removed from the ball 42 and the excess pressure in the valve chamber 38 may bleed upstream between the seating ring 66 and the ball 42. It may also be noted that in the position of the valve seats 66 and 68 shown in FIG. 5, the pressure within the body 22 will be prevented from flowing outwardly around the outer peripheries of the seating rings 66 and 68 by virtue of the sealing rings 70 and 72 being tightly compressed in the respective counterbores 40. As previously noted, the sealing rings 70 and 72 are bonded around the outer peripheries of the sealing rings 66 and 68, and the tight engagement of the sealing rings 70 and 72 with the walls of the counterbores 40 will effectively prevent any leakage of fluid from the chamber 38 between the valve body 22 and either of the flanges 24 or 26.

FIG. 6 illustrates a modified seating ring assembly which may be used in lieu of either or both of the seating rings 66 and 68 in the valve assembly 20. The modified seating ring 66a is formed of a high strength material, such as metal, and has the front face 76a thereof curved to mate with the surface of the ball 42 and provided with an elastic material seal 78a bonded in a mating groove therein for sealing against the outer surface of the ball 42. In this construction, an annular groove 82 is provided in the outer end face 74a of the seating ring 66a coterminous with the outer periphery of the seating ring to receive a modified elastic material sealing ring 70a. The sealing ring 70a is generally shaped in the same manner as the sealing ring 70 previously described, but is of a radial thickness sufficient to extend from the outer wall of the body counterbore 40 into the annular groove 82 in the seating ring 66a and is bonded to the walls of the groove 82. It will thus be apparent that the modified seating ring assembly operates in the same manner as the seating ring assemblies previously described, but by provision of the groove 82, additional surfaces of the sealing ring 70a are bonded to the seating ring for added strength.

Still another modified seating ring assembly construction is illustrated in FIGS. 7, 8 and 9. As shown in FIG. 8, the modified seating ring 66b is provided with a curved front face 76b shaped to mate with the outer surface of the ball 42 and provided with an elastic material seal 78b for sealing against the outer surface of the ball 42. A circumferential flange 84 is formed around the medial portion of the outer periphery of the seating ring 66b. The elastic material sealing ring 70b is bonded to the outer periphery of the flange 84, the outer face of the flange 84 and the outer periphery of the seating ring 66b outwardly of the flange 84 to effectively seal the ring 70b to the sealing ring 66b. It will be observed in FIG. 8 that the sealing ring 70b protrudes a substantial distance outwardly from the outer face 74b of the seating ring 66b and, as will be observed in FIG. 7, the axial thickness of the sealing ring 70b is greater than the depth of the respective counterbore 40 in the body 22. The downstream seating ring 68b and downstream sealing ring 72b are constructed in the same manner as the upstream seating and sealing rings.

When the serating ring assemblies 66b and 68b are installed in the valve body 22, as shown in FIG. 7, the sealing rings 70b and 72b are compressed against the walls of the respective counterbores 40. As previously indicated, the sealing rings 70b and 72b protrude beyond the outer faces of the respective seating rings in the relaxed conditions of the sealing rings, such that the flanges 24 and 26 compress and distort the sealing rings when brought into contact with the opposite ends of the valve body. Thus, the sealing rings 70b and 72b resiliently urge the seating rings 66b and 68b into contact with the ball 42 and effectively prevent the leakage of fluid between either of the flanges 24 or 26 and the respective end of the valve body 22. Since the sealing rings 70b and 72b are larger in outer diameter than the diameters of the respective counterbores 40, the sealing rings also effectively prevent the leakage of fluid around the outer peripheries of the seating rings 66b and 68b. It will also be noted in FIG. 7 that the circumferential flanges 84 on the seating rings proturude into the counterbores 40 but are spaced outwardly of the closed ends of the counterbores when the seating rings are in contact with the ball 42 and the ball 42 is centered in the valve chamber. It will further be noted in FIG. 7 that the distance between the outer end faces 74b of the seating rings 66b and 68b is less than the length of the valve body 22, such that the flanges 24 and 26 will not directly contact the seating rings when the flanges are bolted against the opposite ends of the valve body.

When the valve is closed using the modified seating rings 66b and 68b, as shown in FIG. 9, the ball 42 is moved by the upstream fluid in a direction toward the downstream end 34 of the valve body. The downstream seating ring 68b is thus brought into contact with the flange 26, and, when in this disposition, engages the ball 42 and provides an effective downstream seal for the valve. During the downstream movement of the seating ring 68b, the respective sealing ring 72b is simply further distorted in the respective counterbore 40 and still maintains an effective seal between the valve body 22 and the flange 26, as well as with the walls of the counterbore 40 to prevent the leakage of fluid around the valve seat 68b.

When the ball 42 is moved downstream, the upstream seating ring 66b follows the ball and maintains contact with the ball to provide an effective upstream seal. It will be noted in FIG. 9 that the circumferential flange 84 of the upstream seating ring 66b is positioned so as not to contact the bottom of the respective counterbore 40, even when the ball 42 has been moved sufficiently far downstream that the downstream seating ring 68b is in contact with the flange 26. Thus, the seating ring 66b is maintained in contact with the ball 42 by the combined action of the upstream fluid acting across the seating ring and by the resilient action of the sealing ring 70b to maintain an effective upstream seal. It will also be noted in FIG. 9 that the upstream sealing ring 70b maintains contact with the flange 24 and the walls of the respective counterbore 40 to prevent the leakage of fluid between the flange 24 and the valve body 22, as well as around the outer periphery of the upstream seating ring 66b. It may also be noted, although not shown, that when the valve ball 42 is closed as shown in FIG. 9 and the pressure in the valve chamber 38 builds up to a pressure higher than the upstream pressure, the upstream seating ring 66b will be moved upstream away from the surface of the ball 42 to relieve the body pressure in substantially the same manner as was discussed in connection with FIG. 5.

Still another modified seating ring assembly is illustrated in FIGS. 10 and 11. Referring first to FIG. 11, reference character 66c is the modified seating ring having a front face 76c shaped to mate with the outer surface of the ball 42 and having an elastic material seal 78c bonded in a mating groove therein to seal against the outer surface of the ball 42. An annular groove 86 is formed in the outer end face 74c of the seating ring 66c and extends coterminously with the outer periphery of the seating ring to receive the modified sealing ring 70c. The sealing ring 70c is bonded to the walls of the groove 86 and, in the relaxed condition thereof, extends radially outward beyond the outer periphery of the seating ring 66c and extends aixally a distance to protrude beyond the outer end face 74c of the seating ring 66c. It will also be observed in FIG. 11 that a groove 88 is formed in the outer face of the sealing ring 70c, for purposes to be described. The downstream seating ring 68c and downstream sealing ring 72c, as shown in FIG. 10, are constructed in the same manner as the upstream seating and sealing rings.

The modified seating and sealing rings shown in FIGS. 10 and 11 require the use of a slightly modified valve body 22c which has a bore 90 extending therethrough between the upstream end face 32c and the downstream end face 34c forming a valve chamber 92 for the valve ball 42. Each of the seating rings 66c and 68c has an outer diameter of a size to provide a sliding fit of the respective seating ring in the body bore 90, and the outer diameter of each of the sealing rings 70c and 72c, in the relaxed condition thereof, is greater than the diameter of the bore 90 in order that the sealing rings will be compressed against the walls of the bore 90 when installed in the valve as shown in FIG. 10. The seating rings 66c and 78c and the ball 42 are sized such that the distance between the outer end faces 74c of the seating rings is less than the length of the valve body 22c when the seating rings are in contact with the ball 42 as shown in FIG. 10. As also shown in FIG. 10, each of the sealing rings 70c and 72c protrudes outwardly beyond the respective outer end face 74c of the respective seating ring to be compressed by the flanges 24 and 26 when the valve is assembled to resiliently maintain the seating rings 66c and 68c in contact with the ball 42.

When the modified valve shown in FIG. 10 is closed, the upstream pressure tending to leak between the flange 24 and the valve body 22c will enter the groove 88 in the upstream sealing ring 70c and further deform the upstream sealing ring into tighter engagement with the flange 24 and the adjacent walls of the bore 90 to enhance the action of the sealing ring. It may also be noted that if the ball 42 shown in FIG. 10 is supported in the valve body 22c for movement downstream when in a closed position, as in the embodiments previously described, the upstream seating ring 66c will follow the ball and maintain an upstream seal in all operating positions of the ball. The downstream seating ring 68c is free to move downstream until it contacts the flange 26, much in the same manner as the downstream valve seating rings previously described. Regardless of whether the ball 42 is secured in the valve body 22c in such a manner as to move along the valve chamber or to be retained centered in the valve chamber, the sealing rings 70c and 72c will be maintained in contact with the flanges 24 and 26 in all operating positions of the ball. Further, since the grooves 88 in the sealing ring 70c and 72c face the respective flanges 24 and 26, the fluid on either side of the ball 42 will always act to enhance the sealing action of the respective sealing ring against the respective flanges and valve body.

From the foregoing it will be apparent that the present invention provides a novel ball valve construction which will require the minimum machine work and which will require the minimum of materials of construction. The valve body construction permits the use of standard pipe flanges and thus not only reduces the total cost of the valve assembly but also minimizes the cost of shipping the valve since purchasers may use their own pipe flanges. The present valve may be economically and easily repaired and yet will have a long service life.

Changes may be made in the combination and arrangement of parts or elements as heretofore set forth in the specification and shown in the drawings without departing from the spirit and scope of the invention as defined in the following claims.

What is claimed is:

1. A ball valve for use between a pair of flanges comprising:
   a body having an upstream end face and a downstream end face for contacting said flanges when the valve is assembled between the flanges, and having a bore therethrough between said end faces forming a valve chamber;
   a ball positioned in the valve chamber having a port therethrough;
   means for turning the ball between open and closed positions while allowing the ball to move along said bore when the ball is in a closed position;
   a seating ring of high strength material slidably positioned in each end of said bore having an outer end face facing away from the ball and a front face shaped to slidingly mate with the outer surface of the ball, the distance between the outer end faces of said seating rings, when said seating rings are in contact with the ball, being less than the length of the body between said upstream and downstream end faces; and
   an elastic material sealing ring adhered around each of said seating rings having an outer diameter, in the relaxed condition thereof, greater than the diameter of said bore to be pressed against the body when installed in the valve, each of said sealing rings also projecting outwardly of the outer end face of the respective seating ring, in the relaxed condition of the sealing ring, a sufficient distance to be compressed against the body by the respective flange and urge the respective seating ring toward the ball in all operating positions of the ball.

2. A ball valve for use between a pair of flanges, comprising:
   a body having an upstream end face and a downstream end face for contacting said flanges when the valve is assembled between the flanges, and having a bore therethrough between said end faces forming a valve chamber;
   a ball positioned in the valve chamber having a port therethrough;
   means for turning the ball between open and closed positions while allowing the ball to move along said bore when the ball is in a closed position;
   a seating ring of high strength material positioned in each end of said bore having an outer end face facing away from the ball and a front face shaped to slidingly mate with the outer surface of the ball, the distance between the outer end faces of said seating rings, when said seating rings are in contact with the ball, being less than the length of the body between said upstream and downstream end faces, and each of said seating rings being movable axially in the valve body to maintain contact with the ball in all operating positions of the ball; and
   an elastic material sealing ring adhered around each of said seating rings having an outer diameter, in the relaxed condition thereof, greater than the diameter of said bore to be compressed against the body when installed in the valve, each of said sealing rings also projecting outwardly of the outer end face of the respective seating ring, in the relaxed condition of the sealing ring, a sufficient distance to be compressed against the body by the respective flange and urge the respective seating ring against the ball in all operating positions of the ball.

3. A ball valve for use between a pair of flanges, comprising:
   a body having an upstream end face and a downstream end face for contacting said flanges when the valve is assembled between the flanges, and having a bore therethrough between said end faces forming a valve chamber;
   a ball positioned in the valve chamber having a port therethrough;
   means for turning the ball between open and closed positions;
   a seating ring of high strength material slidably positioned in each end of said bore having an outer end face facing away from the ball and a front face shaped to slidingly mate with the outer surface of the ball, the distance between the outer end faces of said seating rings, when said seating rings are in contact with the ball, being less than the length of the body between said upstream and downstream end faces; and
   an elastic material sealing ring adhered around each of said seating rings having an outer diameter, in the relaxed condition thereof, greater than the diameter of said bore to be compressed against the body when installed in the valve, each of said sealing rings also projecting outwardly of the outer end face of the respective seating ring, in the relaxed condition of the sealing ring, a sufficient distance to be compressed against the body by the respective flange and urge the respective seating ring toward the ball.

4. A ball valve for use between a pair of flanges, comprising:

a body having an upstream end face and a downstream end face for contacting said flanges when the valve is assembled between the flanges, said body having a bore therethrough between said end faces forming a valve chamber and having a counterbore in each end of said bore;

a ball positioned in the valve chamber having a port therethrough;

means for turning the ball between open and closed positions while allowing the ball to move along said bore when the ball is in a closed position;

a seating ring of high strength material slidably positioned in each end of said bore having an outer end face facing away from the ball and a front face shaped to slidingly mate with the outer surface of the ball, each of said seating rings being movable in the valve body to maintain contact with the ball in all operating positions of the ball; and an elastic material sealing ring bonded around each seating ring having an outer diamer, in the relaxed condition thereof, greater than the diameter of the respective counterbore to be compressed against the walls of said counterbore when installed in the valve, that portion of each sealing ring positioned in the respective counterbore having an axial thickness, in the relaxed condition thereof, greater than the depth of the respective counterbore and being extended beyond the outer end face of the respective seating ring to be compressed by the respective flange against the closed end of the respective counterbore and resiliently urge the respective seating ring against the ball.

5. A ball valve as defined in claim 4 wherein each seating ring has an annular groove in the outer end face thereof coterminous with the outer periphery thereof, and the respective sealing ring is bonded in said annular groove.

6. A ball valve as defined in claim 1 wherein each of said seating rings has an annular groove in the outer end face thereof coterminous with the outer periphery thereof, each sealing ring is bonded in the respective groove, and each sealing ring has an annular groove therein communicating with the outer end face of the respective seating ring, whereby fluid under pressure at the outer end face of each seating ring will enter the respective sealing ring groove and press the respective sealing ring against the respective flange and the adjacent portion of the wall of the valve chamber.

7. A ball valve as defined in claim 1 wherein the sealing ring at the upstream end of the valve has an annular groove in the face thereof facing the respective flange, whereby fluid under pressure in the valve chamber upstream of the ball will gain access to said groove and deform the respective sealing ring into tighter sealing engagement with the respective flange and the adjacent wall of the balve chamber.

8. A ball valve as defined in claim 1 wherein each of said sealing rings has an annular groove in the end thereof facing the respective flange, whereby fluid under pressure migrating between the outer end face of the respective seating ring and the respective flange will enter said groove and force the respective sealing ring against the respective flange and the adjacent walls of the valve chamber.

9. A ball valve as defined in claim 8 wherein the portion of each sealing ring radially outward of the respective groove extends further outwardly of the respective seating ring outer end face than does the portion thereof radially inward of the respective groove in the relaxed condition of the sealing ring.

10. A ball valve assembly, comprising:

a body having an upstream end face and a downstream end face and having a bore therethrough between said end faces forming a valve chamber;

a pair of pipe flanges;

a plurality of bolts circumferentially spaced around the body and engaging said flanges to hold said flanges against the upstream and downstream end faces of the body;

a ball positioned in the valve chamber having a port therethrough;

means for turning the ball between open and closed positions while allowing the ball to move along said bore when the ball is in a closed position;

a seating ring of high strength material positioned in each end of said bore having an outer end face facing away from the ball and a front face shaped to slidingly mate with the outer surface of the ball, the distance between the outer end faces of said seating rings, when said seating rings are in contact with the ball, being less than the length of the body between said upstream and downstream end faces, and each of said seating rings being movable axially in the valve body to maintain contact with the ball in all operating positions of the ball; and an elastic material sealing ring adhered around each of said seating rings having an outer diameter, in the relaxed condition thereof, greater than the diameter of said bore to be compressed against the body when installed in the valve, each of said sealing rings also projecting outwardly of the outer end face of the respective seating ring, in the relaxed condition of the sealing ring, a sufficient distance to be compressed against the body by the respective flange and urge the respective seating ring against the ball in all operating positions of the ball.

11. A ball valve assembly, comprising:

a body having an upstream end face and a downsream end face and having a bore therethrough between said end faces forming a valve chamber;

a pair of pipe flanges;

a plurality of bolts circumferentially spaced around the body and engaging said flanges to hold said flanges against the upstream and downstream end faces of the body;

a ball positioned in the valve chamber having a port therethrough;

means for turning the ball between open and closed positions;

a seating ring of high strength material slidably positioned in each end of said bore having an outer end face facing away from the ball and a front face shaped to slidingly mate with the outer surface of the ball, the distance between the outer end faces of said seating rings, when said seating rings are in contact with the ball, being less than the length of the body between said upstream and downstream end faces; and an elastic material sealing ring adhered around each of said seating rings having an outer diameter, in the relaxed condition thereof, greater than the diameter of said bore to be compressed against the body when installed in the valve, each of said sealing rings also projecting outwardly of the outer face of the respective seating ring, in the relaxed condition of the sealing ring, a sufficient distance to be compressed by the respective flange and urge the respective seating ring toward the ball.

12. A ball valve assembly, comprising:

a body having an upstream end face and a downstream end face and having a bore therethrough between said end faces forming a valve chamber, said body also having a counterbore formed concentrically around each end of said bore;
a pair of pipe flanges;
a plurality of bolts circumferentially spaced around the body and engaging said flanges to hold said flanges against the upstream and downstream end faces of the body;
a ball positioned in the valve chamber having a port therethrough;
means for turning the ball between open and closed positions while allowing the ball to move along said bore when the ball is in a closed position;
a seating ring of high strength material slidably positioned in each end of said bore having an outer end face facing away from the ball and a front face shaped to slidingly mate with the outer surface of the ball, each of said seating rings being movable axially in the valve body to maintain contact with the ball in all operating positions of the ball; and
an elastic material sealing ring bonded around each seating ring having an outer diameter, in the relaxed condition thereof, greater than the diameter of the respective counterbore to be compressed against the walls of said counterbore when installed in the valve, that portion of each sealing ring positioned in the respective counterbore having an axial thickness, in the relaxed condition thereof, greater than the depth of the respective counterbore and extended beyond the outer end face of the respective seating ring to be compressed against the closed end of the respective counterbore and resiliently urge the respective seating ring against the ball.

13. A ball valve for use between a pair of flanges, comprising:
a body having an upstream end face and a downstream end face for contacting said flanges when the valve is assembled between the flanges, and having a bore therethrough between said end faces forming a valve chamber;
a ball positioned in the valve chamber having a port therethrough;
means for turning the ball between open and closed positions;
a seating ring of high strength material positioned in the end of said bore adjacent the upstream end face of the body and having an end face facing away from the ball and a front face shaped to slidingly mate with the outer surface of the ball, the outer end face of the seating ring being engageable with the flange that is in contact with the upstream end face of the body; and
an elastic material sealing ring adhered around said seating ring having an outer diameter, in the relaxed condition thereof, greater than the diameter of said bore to be pressed against the body when installed in the valve, the sealing ring also projecting outwardly of the outer end face of the sealing ring, in the relaxed condition of the sealing ring, a sufficient distance to be compressed by the adjacent flange and form a seal between the adjacent flange and the valve body.

14. A ball valve for use between a pair of flanges, comprising:
a body having an upstream end face and a downstream end face for contacting said flanges when the valve is assembled between the flanges, and having a bore therethrough between said end faces forming a valve chamber;
a ball positioned in the valve chamber having a port therethrough;
means for turning the ball between open and closed positions;
a seating ring of high strength material slidingly positioned in the end of said bore adjacent the upstream end face of the body having an outer end face facing away from the ball and a front face shaped to slidingly mate with the outer surface of the ball, the outer end face of the seating ring being engageable with the adjacent flange; and
an elastic material sealing ring adhered around said seating ring having an outer diameter, in the relaxed condition thereof, greater than the diameter of said bore to be compressed against the body when installed in the valve, said sealing ring also projecting outwardly of the outer end face of the seating ring, in the relaxed condition of the sealing ring, a sufficient distance to be compressed against the body by the adjacent flange and urge the seating ring toward the ball.

15. A ball valve for use between a pair of flanges, comprising:
a body having an upstream end face and a downstream end face for contacting said flanges when the valve is assembled between the flanges, said body having a bore therethrough between said end faces forming a valve chamber and having a counterbore in said bore adjacent the upstream end face of the body;
a ball positioned in the valve chamber having a port therethrough;
means for turning the ball between open and closed positions while allowing the ball to move along said bore when the ball is in a closed position;
a seating ring of high strength material slidingly positioned in said bore having an outer end face facing away from the ball and a front face shaped to slidingly mate with the outer surface of the ball, said seating ring being movable in the valve body to maintain contact with the ball in all operating positions of the ball; and
an elastic material sealing ring bonded around the seating ring having an outer diameter, in the relaxed condition thereof, greater than the diameter of the counterbore to be compressed against the walls of the counterbore when installed in the valve, that portion of the sealing ring positioned in the counterbore having an axial thickness, in the relaxed condition thereof, greater than the depth of the counterbore and being extended beyond the outer end face of the respective seating ring to be compressed by the adjacent flange against a closed end of the counterbore and resiliently urge the seating ring against the ball.

16. A ball valve as defined in claim 15 wherein said seating ring has an annular groove in the outer end face thereof, coterminous with the outer periphery thereof, and said sealing ring is bonded in said annular groove.

References Cited

UNITED STATES PATENTS

| | | | |
|---|---|---|---|
| 2,985,421 | 5/1961 | Anderson | 251—172 |
| 3,030,068 | 4/1962 | Priese | 251—172 |
| 3,056,577 | 10/1962 | Kulisek | 251—317 |
| 3,151,837 | 10/1964 | Leek | 251—315 |
| 3,266,769 | 8/1966 | Shand | 251—317 |

FOREIGN PATENTS

| | | |
|---|---|---|
| 1,018,974 | 10/1952 | France. |
| 1,072,917 | 3/1954 | France. |
| 619,659 | 10/1935 | Germany. |

M. CARY NELSON, *Primary Examiner.*

W. CLINE, *Assistant Examiner.*